G. W. PALMER & F. E. PIERCE.
FLUSHING TANK OR CISTERN.
APPLICATION FILED JULY 5, 1906.
954,131.
Patented Apr. 5, 1910.
3 SHEETS—SHEET 1.
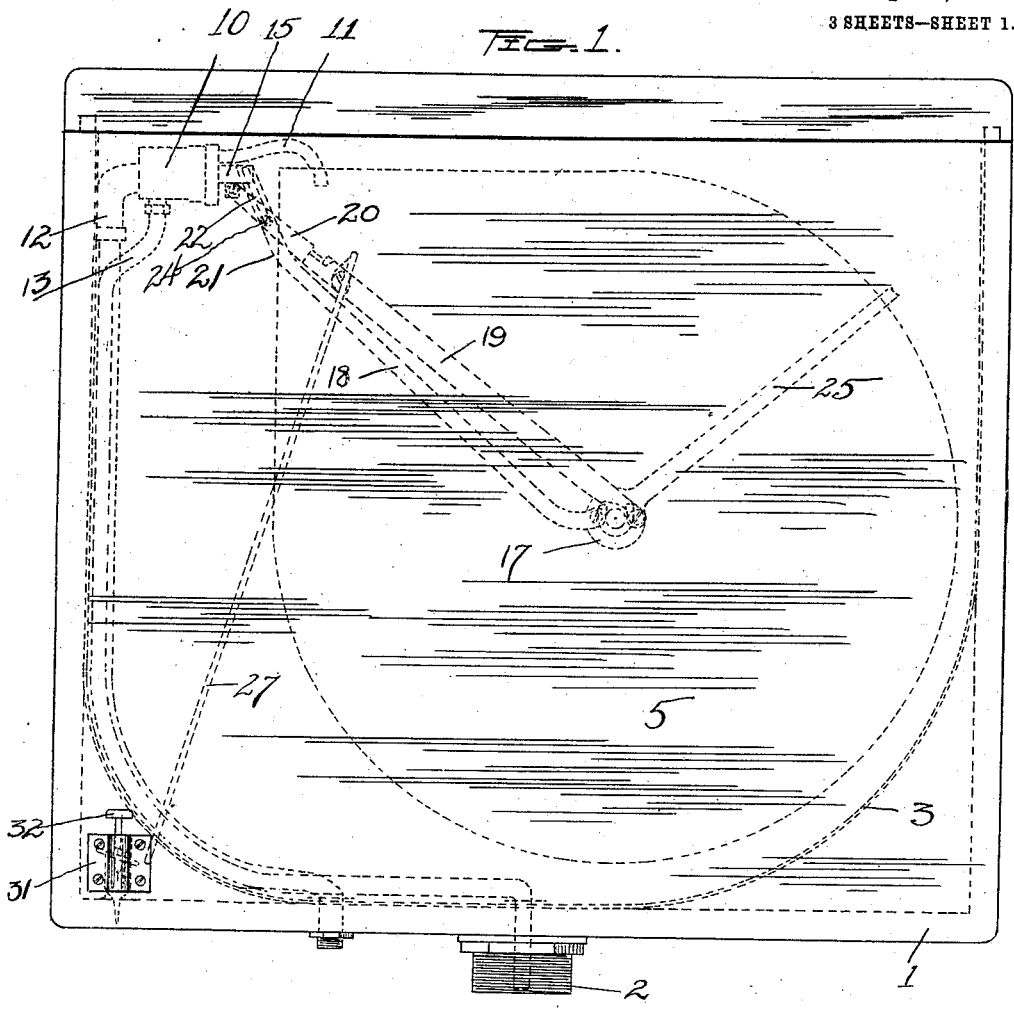
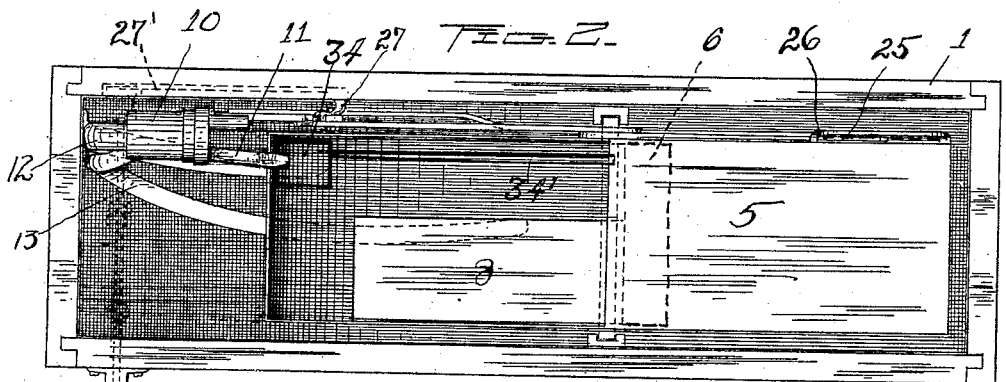

G. W. PALMER & F. E. PIERCE.
FLUSHING TANK OR CISTERN.
APPLICATION FILED JULY 5, 1906.
954,131.
Patented Apr. 5, 1910.
3 SHEETS—SHEET 2.
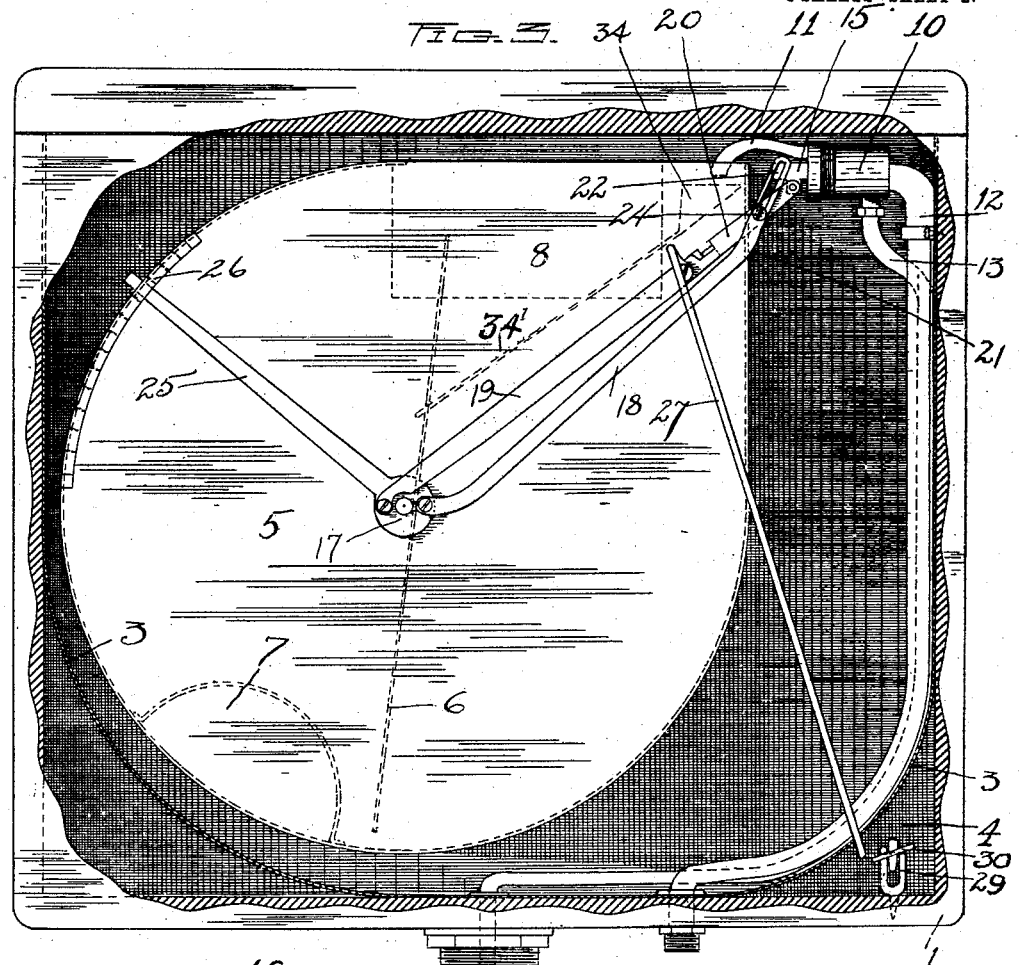
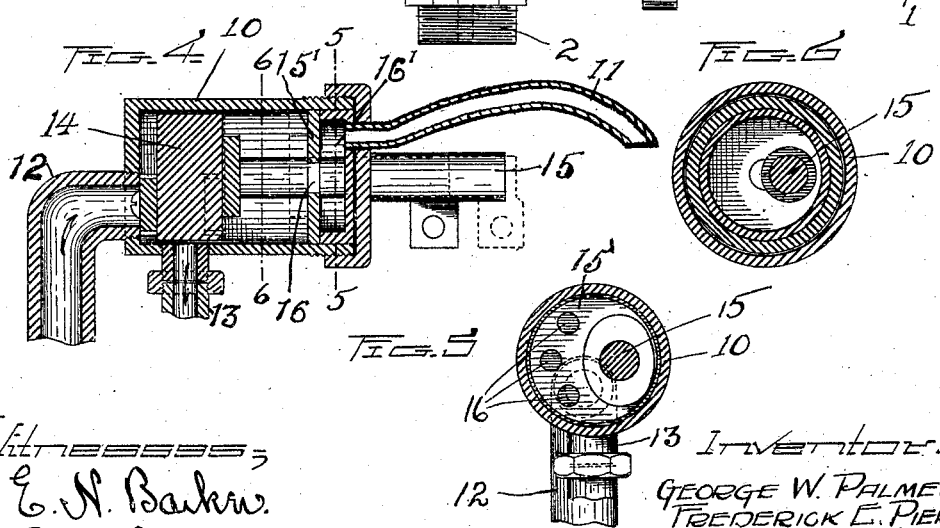

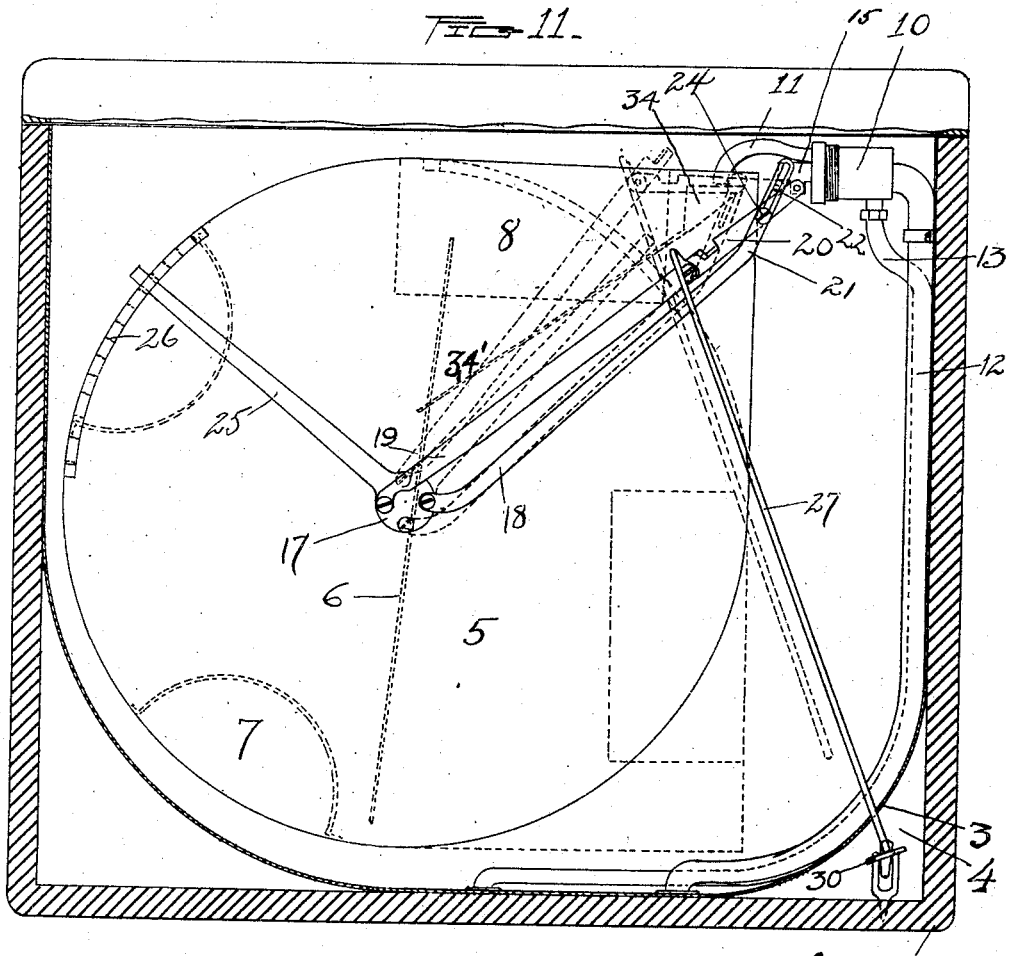

UNITED STATES PATENT OFFICE.

GEORGE W. PALMER AND FREDERICK E. PIERCE, OF LANCASTER, MASSACHUSETTS.

FLUSHING TANK OR CISTERN.

954,131.          Specification of Letters Patent.      Patented Apr. 5, 1910.

Application filed July 5, 1906. Serial No. 324,755.

*To all whom it may concern:*

Be it known that we, GEORGE W. PALMER and FREDERICK E. PIERCE, both of Lancaster, in the county of Worcester and Commonwealth of Massachusetts, have invented certain new and useful Improvements in Flushing Tanks or Cisterns; and we do hereby declare that the following is a full, clear, and exact description of the same.

This invention relates to new and useful improvements in flushing cisterns or tanks, and more particularly to that class wherein the reservoir is dumped within the tank.

It is an object of the invention to provide a novel device of this character wherein the movement of the reservoir returning to its normal position after being dumped is retarded.

It is also an object of the invention to provide novel means whereby the dumping of the reservoir controls the supply valve.

A further object of the invention is to provide novel means whereby the discharge of water is permitted down the supply pipe after the reservoir has been dumped.

The invention also has for an object novel means whereby the reservoir is held against dumping until the same has been filled with the proper amount of water. And it is further an object of the invention to provide novel means whereby the supply of water to the reservoir may be regulated.

Furthermore the invention has for its object, the provision of novel means whereby the reservoir is caused to tilt or dump by the compression of a push button, the same being positioned on the exterior of the tank or casing, it being stated that the cistern is of the low down type, although of course, it can be positioned at any suitable point and any desired means employed for compressing the push button.

Finally an object of the invention is to provide a device of the character noted, which will possess advantages in points of simplicity, efficiency, and durability, proving at the same time comparatively inexpensive to produce and maintain.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view in side elevation of a tank showing the internal mechanism in dotted lines. Fig. 2, is a top plan view of the invention. Fig. 3, is a view partly in elevation and partly in section of the tank. Fig. 4, is a sectional view of the supply valve employed in the invention. Fig. 5, is a sectional view taken on the line 5—5 Fig. 4. Fig. 6, is a view taken on the lines 6—6 of Fig. 4. Fig. 7, is a detail view of the tank, showing the opening through which the operating rod passes. Fig. 8, is a sectional view, showing in top plan, the push button and its intimate mechanism. Fig. 9, is a sectional view showing the push button and its intimate mechanism in side elevation. Fig. 10, is a detail view showing in elevation an end of the water compartment carried by the upper portion of the reservoir. Fig. 11, is a view partly in section and partly in elevation of the invention, the reservoir being indicated in tilted or dumped position by dotted lines.

In the drawings 1, indicates a tank which may be of any ordinary or preferred construction provided with a discharge opening 2, having a lining 3, so arranged as to form a compartment 4, the arrangement of which is known to be old, yet found most essential in the operation of this device. Mounted within the tank is a tilting reservoir 5, which is divided into two compartments by a central partition 6, said partition terminating below the upper edge or surface of the reservoir. This partition tends to reinforce the reservoir and prevents the water or fluid from causing the same to bulge. In the lower part of the reservoir is a chamber 7, which is filled with fluid for the purpose of holding the tank in its normal position. It may be well to mention that any other ballast could be employed with equal success. To the upper portion of the reservoir and to one side of the center is secured a second compartment 8, which has in its outer end, an opening 9, more particularly shown in detail in Fig. 10. When the reservoir is filled, water also enters the compartment 8, through the end, through the medium of the opening 9, it being understood that the reservoir is sufficiently filled by having the partition 6 terminating short of the bottom, to allow the compartment 8 to act as a float, after the water has fully drained therefrom, so that in conjunction with the ballast 7, said compartment will assist the return of the reservoir to its upright position and after said reservoir is filled, it having returned to an upright position, the valve will have closed completely and the compartment 8 will then be filled by the water in the reservoir through the restricted opening 9, and when said reservoir is tilted or dumped the discharge of the fluid from the compartment 8, is retarded and said compartment will act as a temporary ballast to hold the reservoir from quickly assuming its normal position. The reservoir will gradually rise as the fluid is being discharged from the compartment 8. The return movement of the reservoir is caused by the permanent ballast in the compartment 7. In order that the return movement of the reservoir can be regulated, the opening 9, can be varied, simply by bending the tongue formed in the end of the compartment 8 to make the opening smaller or larger as desired and thereby shorten or lengthen the time for the return of the reservoir to its upright position.

Arranged in an upper corner of the tank is a valve casing 10, which is provided with the discharge nozzle 11, and it is through this nozzle and casing that the supply of water is discharged. This valve casing is also in communication with a supply pipe 12, which leads from a suitable source. Also in communication with the valve casing is a pipe 13, which terminates within the discharge opening 2.

Within the valve casing 10, rides a valve 14, operated by the stem 15, which projects beyond said casing. The valve 14, is intended to control the supply pipe 12, and the pipe 13. It may be well to mention at this point that the pipes 12 and 13, communicate with the casing at adjacent points, the pipe 12, through the end of the casing and the pipe 13, through the bottom. When the reservoir is tilted or dumped the valve 14, is moved away from its closed position and the water is allowed to pass through the supply pipe 12, into the casing and through the pipe 13, part of the water passing through the openings 16, through the nozzle 11, into the reservoir 5. It is to be observed that the pipe 13 communicates with the interior of the casing 10 adjacent the end thereof connected to the pipe 12. The pipe 12, is connected to main pressure and the initial movement of the valve 14, will permit the water delivered by the pipe 12, to be discharged under pressure through the pipe 13 in order to assist the flush of the water discharged from the tank, as is believed to be apparent. Adjacent the end of the casing 10, opposed to the pipes 12 and 13, is arranged a plate 15′, forming a compartment 16′, with which the nozzle 11, is in communication. The plate 15′ is provided with a plurality of openings 16, through which the water is adapted to pass into the chamber 16′, and then through the nozzle 11. This plate 15′ retards the flow of water to assure a discharge through the pipe 13 while the openings 16, permit the passage of sufficient water to fill the reservoir 5. As the reservoir gradually assumes its normal position, the valve 14, is gradually closed and the water flows through the nozzle 11, into the reservoir and by the time the reservoir is filled, the valve has closed both the pipe 12 and the pipe 13.

Mounted on one of the supporting trunnions of the reservoir is a washer or plate 17, to which are pivoted arms 18 and 19, the pivotal connections of said arms being oppositely disposed. The arm 19, is pivoted at its opposite end to a short arm 20, which is in turn pivotally secured to the stem 15. The arm 18, terminates in an angular portion 21, provided with a slot 22, through which extend the projections 24, carried by the arm 20. In the initial operation of the device, the valve 14, is opened by an upward push and movement of the arm 19, which will cause the arm 20, to draw the stem out and permits the water to pass down the pipe 13. The movement of the valve is regulated by the arm 18. The washer or plate 17, is provided with an arm 25, which engages notches in the keeper 26, to hold said washer against motion when it has been properly adjusted. The turning of the washer will either retract or project the arm 18, and through the medium of the angular portion 21, the throw of the valve stem will be easily regulated. Moving the rod 25 to the upper end of the keeper 26 will retract the rod 18 and consequently permit the valve stem 15 to be drawn out its full length. A longer time will then be required for the valve to return to its original position, more water entering the reservoir in the mean time; on the other hand, if the rod 25 is moved in the opposite direction, the valve cannot open as far and less water will therefore be permitted to enter the tank. These arms 18, and 19, will cause the valve to close as soon as the reservoir has assumed its normal position.

Secured to the upper end of the arm 19, is a depending rod 27, which when the reservoir is in its normal position has its free end contacting with a pivoted arm 28, said arm being held by a yoke 29, secured to the frame. As more especially disclosed in Figs. 2 and 7 of the drawings, it will be seen that the upper end of the rod 27 is bent outwardly over the top of the lining 3 and then downwardly within a groove 27′ in the tank 1, so that the said rod is sufficiently guided therein to insure its return to contact with the plate 30, when the reservoir returns to its upright position. That portion 30, of the arm contacting with the arm 27, is flat. The opposite end of the arm 28, projects through the wall of the tank and terminates within a housing 31, in which is movable vertically, a push button 32, which is secured to the upper end of an extension 28' and when said button is depressed with the arm 28, it elevates the flattened portion which contacting with the rod 27, will force the arm 19, upward and thereby move the valve 14, and at the same time cause the reservoir to dump. As soon as the reservoir tilts the rod 27, swings inward away from the arm 28, so that it will be impossible to operate the valve mechanism until the reservoir has returned to its normal position. When the rod 27, is forced upward it is pressed against the projecting portion of the opening in the side of the reservoir against its shoulder 33, as more especially disclosed in Fig. 7 of the drawings, which carries the lower end of the rod forward and forces said rod away from the operating arm 28 to assist in breaking the rigid joint connection between the arms 19 and 20.

After the reservoir has been dumped, the water flows from the supply pipe 12 through the perforations 16 and nozzle 11, into the rear compartment. The water will continue to flow into the rear compartment until the reservoir is partly righted, due to the action of the ballast 7 and the float action of the compartment 8 and the partition 6 passes to such a position that the nozzle 11 can no longer discharge in the rear compartment. The water that enters the rear compartment will assist in the return of the reservoir until the partition 6 passes to the rear of the discharge when water will discharge into the forward compartment. When the reservoir has nearly reached an upright position, water will discharge onto the chute 34 which is provided with a pipe 34' by which it is put in communication with the rear compartment through the partition 6, so as to discharge the flow of water from the nozzle 11 into the said rear compartment and thereby insure the full return of the reservoir and a complete closing of the valve. The flow of water to the rear compartment will therefore continue until the partition 6 is passed when water will empty into the forward compartment, but the water in both compartments will seek the same level, it being understood that the partition 6 is soldered to the sides of the tank but terminates short of the bottom so that water may pass slowly from one compartment to the other.

In order that the push button 32, may be held normally elevated, the spring 35, is interposed between the arm 28, and the base of the tank as shown in detail Fig. 9.

Having fully described our invention what we claim as new and desire to secure by Letters Patent, is—

1. In combination, a tank, a tilting reservoir therein, a partition within the reservoir dividing the same into compartments, a supply pipe for the tank discharging within one of the compartments and a chute passing through the partition and discharging in the second compartment, said chute terminating at one end beneath the supply pipe.

2. In combination, a tank, a reservoir mounted therein to rotate, a plate mounted on one of the trunnions of the reservoir, a valve connection between the plate and the valve for regulating said valve when the plate is turned and means operating in conjunction with said connection for tilting the reservoir.

3. In combination, a tank, a tilting reservoir therein mounted to rotate, a plate mounted on one of the trunnions of the reservoir, a valve connection between the plate and valve, means operating in conjunction with the connection and plate for adjusting the valve and means for turning the plate.

4. In combination, a tank, a reservoir therein mounted to rotate, a plate mounted on one of the trunnions of the reservoir, a valve, connections between the plate and valve for regulating said valve when the plate is turned, and means for turning the plate.

GEORGE W. PALMER.
FREDERICK E. PIERCE.

Witnesses:
 O. A. TAFT,
 C. S. TAFT.